Patented May 18, 1954

2,678,951

UNITED STATES PATENT OFFICE 2,678,951

ALKYLATION OF PHENOLS

William C. Smith, Houston, Tex., and Bruce Masterton, Walnut Creek, Calif., assignors to Shell Development Company, Emeryville, Calif., a corporation of Delaware No Drawing. Application December 26, 1951,
Serial No. 263,469

13 Claims. (Cl. 260—621)

This invention relates to the catalytic vapor phase alkylation of phenols with alcohols and deals with a new method of carrying out such alkylations in the presence of alumina catalysts to produce monoalkylation products of the starting phenol in a more advantageous manner.

It is known that phenols, such as phenol, cresol, xylenols, catechols, resorcinols, pyrogallols, hydroquinones, etc., may be alkylated by reaction with alcohols in the presence of alumina catalysts such as activated bauxite, and the like. As previously carried out, these alkylations have been subject to considerable by-product formation, and control of the reaction to favor production of monoalkylation products and to suppress formation of polyalkylation products has not been entirely successful. The method has consequently been chiefly useful where introduction of a plurality of new alkyl groups in the starting phenol is desired.

An important object of the present invention is to provide an improved method of alkylating phenols by reaction in the vapor phase with alcohols in the presence of alumina catalysts whereby improved selectivity of reaction to monoalkylation products is achieved. Another object is to obtain higher yields and conversions to desired monoalkylation products of phenols in this reaction. A special object is the methylation of alkyl phenols having not more than two alkyl groups per molecule to the corresponding alkyl phenols having one added methyl group in a more advantageous manner. Another object of the invention is to provide a unique combination of operating conditions under which phenols can be more efficiently alkylated by reaction in the vapor phase with alcohols when using alumina catalysts. Still another object is the provision of more effective alumina catalysts for alkylating phenolic compounds of any type with alcohols or ethers. Further objects and advantages of the invention will be apparent from the following description of the new method.

It has been found that by the use of a diluent such as added steam under the proper combination of reaction conditions, particularly mole ratio of alcohol to phenol and temperature, optimum yields and conversions of phenols, particularly of alkyl phenols, to monoalkylation products are obtained when carrying out the reaction in the vapor phase in the presence of activated alumina catalysts. This was unexpected in view of the fact that steam is a product of the desired alkylation—hence, its addition would have been predicted to be disadvantageous because it would retard the reaction and reduce conversion and throughput without offering any compensating improvement which would have been foreseen. In practice, however, the addition of substantial amounts of steam, either separately or together with the reactants, produces the reverse of the expected effects and gives improved yields and conversions of desirable monoalkylation products.

Most advantageously, the reaction is carried out under the following combination of operating conditions:

Mole ratio of steam to starting phenol, 2:1 to 6:1, preferably 3:1 to 4:1
Mole ratio of alcohol to starting phenol, 0.5:1 to 1:1, preferably 0.6:1 to 0.9:1
Temperature, 425° C. to 550° C., preferably 475° C. to 530° C.
Pressure, p. s. i. g., 60 to 120, preferably 80 to 100
Throughput rate, moles of organic reactants per hour per gallon of catalyst, 0.2 to 0.5, preferably 0.25 to 0.35

While higher ratios of steam may be employed successfully, they are generally less desirable because they reduce plant capacity. It is likewise feasible to increase the operating pressure in the process, but, as a rule, the increased cost which this entails is not offset by any advantage. The throughput rate can also be varied beyond the foregoing limits; but, depending on the activity of the alumina catalyst which tends to decrease with use, the throughput rate is advantageously varied within these limits since higher rates reduce the conversion and lower rates tend to reduce the yield. However, it is important for the best results that the reaction temperature and the mole ratio of alcohol to phenol be maintained within the indicated limits.

The process is of special advantage for the monoalkylation of alkyl phenols having a hydrogen atom attached to a carbon atom in ortho position to the hydroxyl group, using a primary alcohol as the alkylating agent. Typical examples of alkylations of this type which have been successfully carried out are, for instance, the reaction of ortho-, meta- and para-cresols; 2,3-, 2,4- 2,5-, 3,4- and 3,5-xylenols; 2,3,4- and 3,4,5-trimethyl phenols; ortho-, meta-, and para-ethyl phenols; thymol; 3-methyl-5-ethyl phenol; para-phenylphenol and 3 - tertiary butyl - 5-octyl phenol with methanol, ethanol, n-butanol, n-hexanol and lauryl alcohol. The process of the invention is of special importance in the monomethylation of 3,5-xylenol due to the commercial demand for the 2,3,5-trimethyl phenol produced for use in vitamin synthesis. However, other phenols, including phenol itself, 2,4,6-trimethyl phenol, naphthol, resorcinol, guaicol, catechol, pyrocatechol, pyrogallol, anthranol, flavol and like phenols which exist in the vapor phase under the reaction conditions, can be alkylated according to the new process by reaction with any of the foregoing alcohols or other alcohols such as isopropyl, isobutyl, the secondary amyl, the heptyl, the octyl, the decyl, the hexadecyl, the octadecyl, cyclohexyl, and benzyl alcohols, for example. While primary and secondary saturated alcohols are preferred, the reaction can also be carried out with tertiary and/or unsaturated alcohols of which tertiary butyl, allyl, cyclohexenyl, cinnamyl and like alcohols are typical.

The process can be carried out batchwise, intermittently or continuously. One advantageous method of continuous operation is to preheat the reactants with steam to a temperature about 20° to 30° below the desired reaction temperature, preferably to about 500° C., and to feed the mixture through a reactor packed with pellets of activated alumina catalyst under adiabatic reaction conditions and distilling the reactor effluent to recover the alkyl phenol produced. Reaction cycles of about 2 to 6 hours, preferably about 4 hours, between reactivations of the catalyst by heating with air and steam at about 700° C. to 800° C., preferably 725° C. to 775° C., are employed. Instead of granular or pelleted catalyst, the alumina can be in the fluidized form and a part can then be conveniently withdrawn continously or intermittently for reactivation and returned to the reaction without interrupting the production of alkylated phenol.

Aluminum oxides especially useful as catalysts in the new process are the aluminas having adsorptive properties. Such adsorptive aluminas can be obtained from natural sources or they can be prepared synthetically. Thus, suitable catalysts may be prepared from natural bauxite ore, for example. Such aluminas vary somewhat in their activity as catalysts for the process of the invention depending upon the location from which the bauxite is obtained and the subsequent treatment accorded them. For example, the calcination temperature has an effect upon the surface area and the adsorptive capacity of the resulting catalyst. The iron which may be present in the starting bauxite should preferably be removed, magnetic methods of separation being often suitable for such separation. It is also desirable to prevent deposition of iron on the catalyst during its use in the process. As a rule, it is preferred to maintain the iron content of the catalyst below about 0.4% at all times, as higher contents of iron often shorten the effective life of the catalyst. Care should therefore be taken to prevent transfer of iron, for example in the form of oxides, from the apparatus to the catalyst by the feed streams. The activated bauxite sold by the Porocel Corporation under the trade name "Porocel" is typical of the aluminas of this type which are suitable for use as catalysts in the new process.

Synthetic alumina catalysts can be prepared from gels which may be peptized or unpeptized, but they are preferably prepared from the crystalline form such as the crystalline alpha alumina trihydrate crystallized from alkali aluminate solutions. A well-known activated alumina is that sold by the Aluminum Ore Company under the trade name "Alorco" (Grade F–11). A variety of suitable means for activating alumina are in existence, such as the ones described in U. S. Patents 1,868,869 and 2,015,593. The process of the U. S. Patent 1,868,869 comprises subjecting to calcination, at a temperature of from 300° C. to 800° C., the deposit which forms in the precipitation tanks and discharge pipes used in the execution of the Fickes-Sherwin modification of the Bayer process. Other suitable methods of preparing and activating the alumina catalyst will be apparent to those skilled in the art.

A special feature of the present invention is the use of alumina catalysts which have been activated by the inclusion of certain controlled amounts of calcium. These additions of calcium make the catalyst more advantageous for the alkylation of phenolic compounds regardless of the operating conditions used. Thus, it has been found that the inclusion of between about 1% and about 2%, preferably 1.25% to 1.75%, of calcium makes alumina catalysts much more selective for monoalkylation of phenolic compounds and, by suppressing the formation of higher boiling alkylates, materially increases the yield of phenols or alkyl phenols having one added alkyl group.

The calcium may conveniently be introduced into the catalyst by soaking alumina in an aqueous solution of any water-soluble calcium salt such, for example, as the nitrate, chloride, acetate, formate or the like, the amount and concentration of solution being controlled so as to introduce the required amount of calcium. Alternatively, the calcium may be introduced into synthetic alumina catalysts during the process of their manufacture. In any case, it is desirable that the activated alumina have from about 1% to about 2% of calcium on the surface of the catalyst. It is usually preferable to use solutions of calcium compounds which decompose on heating to yield calcium oxide and to carry out such decomposition before using the catalyst in the process of the invention; however, the decomposition may be effected simultaneously with the alkylation reaction where the decomposition products do not unduly complicate the recovery of the desired alkylated phenolic product. In the same way other alkaline earth metal salts or alkali metal salts such as barium or sodium and potassium nitrates and the like may be used to obtain promoted alumina catalysts useful in the process of the invention. Adsorptive aluminas promoted with about 1% to about 2% of calcium are preferred catalysts because of their selectivity.

The following examples illustrate the process of the invention in some of its advantageous embodiments.

*Example I*

The methylation of 3,5 - xylenol to 2,3,5 - trimethyl phenol was carried out in a stainless steel tubular reactor four feet high, the bottom 15 inches of which was packed with 8–14 mesh "F–11 Alorco" alumina while the top 33 inches was a preheater section packed with Carborundum. The xylenol and methanol were blended, and the blend was metered as a single stream to the preheating section of the reactor. The effect of steam dilution of the feed is shown by the following results for comparative runs carried out under the following conditions when using reaction cycles of four hours which were followed by reactivation of the catalyst at 700° C. to 730° C. with air diluted with steam:

```
Mole ratio of methanol to xylenol-------------------------------------- 1:1
Temperature----------------------------------------------------------- °C. 485
Feed rate (total moles of xylenol and methanol per hour per gallon of catalyst)-------------- 10–10.3
Pressure, p. s. i. g.-------------------------------------------------- 102–104
```

| Steam Diluent | Mole Percent Xylenol Conversion | | | Mole Percent Methanol Conversion | | Mole Percent Yield 2,3,5-Trimethyl Phenol | |
|---|---|---|---|---|---|---|---|
| | To 2,3,5-Trimethyl Phenol | To lower Boiling Phenolic Compounds | To Higher Boiling Products | To 2,3,5-Trimethyl Phenol | To Higher Boiling Products | Based on Xylenol | Based on Mehanol |
| None | 31.3 | 13.1 | 24.0 | 31.3 | 48.0 | 44.8 | 31.2 |
| 3 moles steam/mole xylenol | 34.2 | 9.2 | 23.8 | 34.2 | 47.6 | 51.5 | 34.1 |

A similar improvement in conversion and yield can be obtained when methylating petroleum cresylic acids having a 95% ASTM distillation point of 220° C. under the same conditions.

*Example II*

In the same reactor used in Example I a series of runs were made in a similar way to show the effect of reaction temperature. The catalyst was Alorco F–11 alumina of 8–14 mesh modified with 1.7% by weight of calcium introduced as calcium nitrate and decomposed to calcium oxide before the start of operations. The feed was methanol, xylenol and steam in a mole ratio of 0.67:1.0:3.0. The tests were made under a pressure of 100 p. s. i. g. using a feed rate of total organics of 9.2 to 10.6 moles per hour per gallon of catalyst.

was diluted with three moles of steam per mole of phenol fed.

| Mole Ratio of Methanol to 3,5-Xylenol in the Feed | Mole Percent Conversion of Xylenol to 2,3,5-Trimethyl Phenol | Mole Percent Yield of Trimethyl Phenol | |
|---|---|---|---|
| | | Based on Xylenol | Based on Methanol |
| 0.31:1 | 20.6 | 64.0 | 66.6 |
| 0.67:1 | 30.7 | 56.5 | 46.0 |
| 1:1 | 34.2 | 51.5 | 34.1 |

Other alkylations which are equally successful under these conditions are the methylation of meta-octylphenol with methanol to 2-methyl-3-octylphenol, the isopropylation of 3,5-xylenol to 2-isopropyl-3,5-dimethylphenol, and the ethylation of thymol to produce 2-ethyl-3-methyl-6-isopropylphenol.

*Example IV*

Comparative tests were made in pilot plant apparatus having a production rate of about 20 gallons per hour of the effect of added calcium content on the activity of alumina catalysts in the methylation of xylenols with methyl alcohol. The methanol and xylenol were blended in a heated tank at 60° C. in a mole ratio of 0.74:1 and fed through jacketed lines and a filter which reduced the iron content of the organic feed from

| Temp., °C. | Mole Percent Xylenol Conversion | | | | Mole Percent Methanol Conversion | | Mole Percent Yield Trimethyl Phenol | |
|---|---|---|---|---|---|---|---|---|
| | To Tri-Methyl Phenol | To Lower Boiling Compounds | To Higher Boiling Compounds | Total | To Tri-Methyl Phenol | To Higher Boiling Compounds | Based on Xylenol | Based on Methanol |
| 425 | 8.2 | 6.1 | 2.0 | 17.7 | 12.1 | 5.8 | 46.2 | 36.6 |
| 450 | 19.5 | 7.5 | 5.2 | 33.4 | | | 56.0 | 40.5 |
| 485 | 26.1 | 9.0 | 6.9 | 42.8 | 38.7 | 19.4 | 61.0 | 42.0 |
| 545 | 24.8 | 9.7 | 7.0 | 42.5 | 37.0 | 21.0 | 58.5 | 37.0 |

A similar effect is found when alkylating phenol with ethanol under these conditions.

*Example III*

The effect of variations in the mole ratio of alcohol to phenol in the feed was determined by a series of runs in the foregoing apparatus using Alorco F–11 catalyst at 485° C. and about 100 p. s. i. g. In all cases the reaction mixture 0.003% to 0.0001% to the reactor in which these reactants were passed in vapor phase together with steam in a mole ratio of 3.7 to 4:1 based on the xylenol over Alorco F–11 alumina catalyst at 80 to 85 p. s. i. g. The temperature of the steam and organic reactants was increased to 410° C. to 490° C. before they entered the adiabatic reactor containing the catalyst. The exothermic reaction in the bed further raised the temperature to 490° C. to 530° C. At a throughput rate of 0.31 to 0.34 mole of organic reactants per hour per gallon of catalyst, the following results were obtained.

| Added Calcium in the Alumina | Mole Percent Conversion of Xylenol | | | | Mole Percent Yield of Trimethyl Phenol | |
|---|---|---|---|---|---|---|
| | To Tri-Methyl Phenol | To Lower Boiling Compounds | To Higher Boiling Compounds | Total | Based on Xylenol | Based on Methanol |
| None | 24 | 5.0 | 27 | 57 | 44 | 26 |
| 0.5% | 27 | 4.0 | 20 | 45 | 62 | 36 |
| 1.0% | 29 | 4.0 | 14 | 39 | 76 | 44 |
| 1.5% | 29 | 3.0 | 10 | 36 | 82 | 47 |
| 2.0% | 27 | 3.0 | 8 | 36 | 74 | 42 |

Similarly, increased yields of dimethyl ethyl phenol are obtained in methylating 2-methyl-4-ethyl phenol with methanol in the presence of steam at a mole ratio of 1:0.6:3.5 and a temperature of about 500° C. under 90 p. s. i. g. pressure when about 1.5% calcuim is added to a "Porocel" alumina catalyst.

It will thus be seen that the process of the invention has many advantages and is capable of considerable variation, particularly in regard to the phenolic compounds which may be alkylated and the alcohols which may be used as alkylating agents, this being particularly true with respect to the application of the new calcium-promoted alumina catalysts in this process. Still other variations in the process can be made without departing from the invention which is not limited by any theory suggested in explanation of the improved results which are obtained.

We claim as our invention:

1. A process of producing 2,3,5-trimethyl phenol which comprises contacting methanol and 3,5-xylenol in the vapor phase with an adsorptive alumina catalyst at 475° C. to 550° C. in a mole ratio of 0.5:1 to 1:1 mole of methanol per mole of xylenol and adding to the reaction mixture 2 to 6 moles of steam per mole of xylenol fed to the reaction.

2. A process according to claim 1 wherein the pressure in the reaction zone is maintained between about 60 and 120 p. s. i. g.

3. A process according to claim 2 wherein the feed rate of methanol plus xylenol to the reaction is between 0.2 and 0.4 mole per hour per gallon of catalyst.

4. A process of producing 2,3,5-trimethyl phenol which comprises contacting methanol and 3,5-xylenol in the vapor phase with an adsorptive alumina catalyst containing about 1% to about 2% of calcium, said calcium being substantially in the form of calcium oxide, at 475° C. to 550° C. in a mole ratio of 0.6:1 to 0.9:1 mole of methanol per mole of xylenol and adding to the reaction mixture 2 to 6 moles of steam per mole of xylenol fed to the reaction.

5. A process of producing a 2-methyl-3,5-dialkyl phenol which comprises contacting a mixture of methanol and a 3,5-dialkyl phenol in a mole ratio of 0.5:1 to 1:1 in the vapor phase with an adsorptive alumina catalyst at 425° C. to 550° C. in the presence of added steam in the amount of 2 to 5 moles per mole of said dialkyl phenol.

6. A process of producing a 2,3,5-trialkyl phenol which comprises contacting a mixture of a saturated primary alcohol of 1 to 18 carbon atoms per molecule and a 3,5-dialkyl phenol in a mole ratio of 0.5:1 to 1:1 in the vapor phase with an adsorptive alumina catalyst at 425° C. to 550° C. in the presence of added steam in the amount of 2 to 5 moles per mole of said dialkyl phenol.

7. A process of producing a trialkyl phenol which comprises contacting a mixture of a saturated primary alcohol of 1 to 18 carbon atoms per molecule and a dialkyl phenol having a hydrogen atom attached to a nuclear carbon atom adjacent to the carbon atom to which the phenolic hydroxyl group is attached in a mole ratio of 0.5:1 to 1:1 in the vapor phase with an adsorptive alumina catalyst at 425° C. to 550° C. in the presence of added steam in the amount of 2 to 5 moles per mole of said dialkyl phenol.

8. A process of producing an alkyl phenol which comprises contacting a mixture of a saturated aliphatic alcohol and a phenol having a hydrogen atom attached to a nuclear carbon atom adjacent to the carbon atom to which the phenolic hydroxyl group is attached in a mole ratio of 0.5:1 to 1:1 in the vapor phase with an adsorptive alumina catalyst at 425° C. to 550° C. in the presence of added steam in the amount of 2 to 5 moles per mole of said phenol.

9. A process of producing an alkyl phenol which comprises contacting a mixture of an aliphatic alcohol and a phenol having a replaceable hydrogen atom in a mole ratio of 0.5:1 to 1:1 in the vapor phase with an adsorptive alumina catalyst containing between about 1% and about 2% by weight of calcium, said calcium being substantially in the form of calcium oxide, at 475° C. to 550° C. in the presence of added steam in the amount of 2 to 5 moles per mole of said starting phenol.

10. A process of producing an alkyl phenol which comprises contacting a mixture of an aliphatic alcohol and a phenol having a replaceable hydrogen atom in the vapor phase, together with about 2 to about 6 moles of added steam per mole of said starting phenol, with an adsorptive alumina catalyst containing between about 1% and about 2% by weight of calcium, said calcium being substantially in the form of calcium oxide, at 425° C. to 550° C.

11. A process for the vapor phase alkylation of a phenol having a replaceable hydrogen atom attached to a nuclear carbon atom with an alcohol which comprises contacting said phenol and alcohol in the vapor phase with an adsorptive alumina in the presence of added steam.

12. A process for the vapor phase methylation of a phenol having a replaceable hydrogen atom attached to a nuclear carbon atom which comprises contacting said phenol and methanol in the vapor phase, together with at least two moles of added steam per mole of said phenol, with an adsorptive alumina containing about 1% to about 2% by weight of calcium, said calcium being substantially in the form of calcium oxide.

13. A process for the vapor phase monoalkylation of a phenol having a replaceable hydrogen atom attached to a nuclear carbon atom with an alcohol which comprises contacting said phenol and alcohol in the vapor phase with an absorptive alumina containing about 1% to about 2% by weight of calcium, which calcium is in combined form, in the presence of added steam in the amount of 2 to 6 moles per mole of said starting phenol, whereby monoalkylation of said phenol is promoted and formation of higher boiling products is suppressed.

References Cited in the file of this patent

UNITED STATES PATENTS

| Number | Name | Date |
|---|---|---|
| 2,448,942 | Winkler et al. | Sept. 7, 1948 |